(12) United States Patent
Rogers et al.

(10) Patent No.: US 8,548,753 B2
(45) Date of Patent: Oct. 1, 2013

(54) VELOCITY-ENHANCED FLOW MEASUREMENT

(75) Inventors: Steven Bruce Rogers, Minnetonka, MN (US); Andrew J. Klosinski, Waconia, MN (US)

(73) Assignee: Rosemount Inc., Eden Prairie, MN (US)

( * ) Notice: Subject to any disclaimer, the term of this patent is extended or adjusted under 35 U.S.C. 154(b) by 808 days.

(21) Appl. No.: 12/492,649

(22) Filed: Jun. 26, 2009

(65) Prior Publication Data

US 2009/0326839 A1   Dec. 31, 2009

Related U.S. Application Data

(60) Provisional application No. 61/076,261, filed on Jun. 27, 2008.

(51) Int. Cl.
*G01F 1/44* (2006.01)

(52) U.S. Cl.
USPC ............ 702/47; 73/861.22; 73/861.64

(58) Field of Classification Search
USPC ............ 702/47; 73/861.22, 861.64
See application file for complete search history.

(56) References Cited

U.S. PATENT DOCUMENTS

| | | | | |
|---|---|---|---|---|
| 2,772,567 | A | 12/1956 | Boden et al. | 73/231 |
| 4,312,234 | A | 1/1982 | Rhodes et al. | 73/861.04 |
| 4,896,541 | A | 1/1990 | Hughes | 73/861.22 |
| 5,436,824 | A | 7/1995 | Royner et al. | 363/89 |
| 7,258,024 | B2 * | 8/2007 | Dimarco et al. | 73/861.22 |
| 7,484,426 | B2 | 2/2009 | Evans et al. | 73/861.52 |
| 2008/0319685 | A1 * | 12/2008 | Xie et al. | 702/45 |

FOREIGN PATENT DOCUMENTS

| | | |
|---|---|---|
| GB | 2 161 941 A | 1/1986 |
| JP | 10170320 | 6/1998 |
| JP | 2790260 | 8/1998 |
| JP | 2000002567 | 1/2000 |
| WO | WO 2007/084652 | 7/2007 |
| WO | WO 2008/025934 A1 | 3/2008 |

OTHER PUBLICATIONS

International Search Report and written Opinion for application No. PCT/US2009-048337, dated Dec. 18, 2009.

(Continued)

*Primary Examiner* — Jonathan C Teixeira Moffat
*Assistant Examiner* — Hien Vo
(74) *Attorney, Agent, or Firm* — Westman, Champlin & Kelly, P.A.

(57) ABSTRACT

A process fluid flow measurement device includes a fluid flow member having an inlet with a first diameter and a throat with a second diameter that is smaller than the first diameter. A first process fluid pressure tap is disposed proximate the inlet and a second process fluid pressure tap is disposed proximate the throat. A differential pressure sensor is operably coupled to the first and second process fluid pressure taps. Differential pressure measurement circuitry is coupled to the differential pressure sensor to provide a differential pressure signal related to a difference in pressure between process fluid pressure at the first and second taps. A process fluid velocity measurement device is positioned in the throat to measure a velocity of process fluid flowing therethrough and provide a fluid velocity indication. The differential pressure sensor signal and the fluid velocity indication are used to provide a calculated indication of fluid flow. This calculated indication can be relative to multiphasic fluids such as two-phase or three-phase fluids.

25 Claims, 8 Drawing Sheets

(56) References Cited

OTHER PUBLICATIONS

Communication pursuant to Rules 161 and 162 from European patent application No. 09771136.0 dated Feb. 16, 2011.
First Office Action from the related Chinese patent application No. 200980124202.4 dated Mar. 6, 2012.
First Office Action from the related Japanese patent application No. 2011-516711 dated Mar. 21, 2012.
Second Office Action from the corresponding Chinese patent application No. 200980124202.4 dated Dec. 4, 2012.

* cited by examiner

VELOCITY-ENHANCED FLOW MEASUREMENT

CROSS-REFERENCE TO RELATED APPLICATION

The present application is based on and claims the benefit of U.S. provisional patent application Ser. No. 61/076,261, filed Jun. 27, 2008, the content of which is hereby incorporated by reference in its entirety.

BACKGROUND

The flow of a fluid through a pipe or conduit is often measured in order to control the flow and/or monitor the amount of fluid passing through the conduit. Various methods exist for measuring flow of fluid through a conduit. These methods include a measurement of differential pressure across a fluid flow obstruction, utilization of magnetic flow meter (magmeter), and utilization of a vortex flow meter. These various devices and technologies generally employ different techniques in order to sense aspects of the fluid flow. In some cases, fluid velocity is measured and sometimes mass flow is calculated as well.

Measuring flow of a fluid using differential pressure measurement techniques generally includes utilization an obstruction device, such as an orifice plate, to partially obstruct the fluid flow. This partial obstruction generates a differential pressure between the upstream flow and the downstream flow. Measuring the differential pressure between locations upstream and downstream of the obstruction can provide an indication of flow. Generally, additional information is required in order for the differential pressure measurement to provide mass flow information. Specifically, information about the composition, pressure and temperature of the fluid must be known or measured. This is due, at least in part, to the fact that the differential pressure is not only based on the flow, but also is based on the fluid density, which itself may be a function of pressure and temperature. Further, the nature of the flow, laminar, transitional, or turbulent, may affect the differential pressure reading.

Vortex flow meters employ an operating principle based on the phenomenon of vortex shedding known as the von Karman effect. As fluid passes a bluff body, it separates and generates small eddies or vortices that are shed alternately along and behind each side of the bluff body. These vortices cause areas of fluctuating pressure that are detected by a sensor. The frequency of vortex generation is essentially proportional to fluid velocity.

Magnetic flow meters (magmeters) include a segment of pipe or conduit which measures the velocity of fluid passing through it. The flow meter creates a magnetic field in the fluid which induces an electromotive force (emf) or voltage in the fluid. The magnitude of the emf induced in the fluid is proportional to the velocity of the fluid flowing through the pipe. By measuring the induced emf, the magnetic flow meter measures the velocity of the fluid flow through the pipe. The flow meter creates the magnetic field by passing a current through coils encircling a pipe through which conductive fluid flows. The magnitude of the field is given by Ampere's law and is perpendicular to the flow of fluid through the pipe. Two electrodes, generally flush mounted on opposite sides of the flow pipe, measure the electric potential in the fluid.

In many process installations, a process fluid flows through a conduit, such as process piping. The process fluid may be a liquid, a gas, or a combination of both. In applications where the process fluid is a single homogenous phase (liquid, vapor, or gas) whose composition does not change with time, the calculation of flow parameters, such as mass flow, is relatively straightforward. However, in applications where the process fluid is not homogenous (such as with immiscible liquids), or whose composition changes with time, the calculation of flow parameters is more difficult. Examples of process fluids that generally have a liquid intermingled with a gas (e.g., multiphasic) include wet steam; mixtures of oil and natural gas; and mixtures of water, oil and natural gas.

SUMMARY

A process fluid flow measurement device includes a fluid flow member having an inlet with a first diameter and a throat with a second diameter that is smaller than the first diameter. A first process fluid pressure tap is disposed proximate the inlet and a second process fluid pressure tap is disposed proximate the throat. A differential pressure sensor is operably coupled to the first and second process fluid pressure taps. Differential pressure measurement circuitry is coupled to the differential pressure sensor to provide a differential pressure signal related to a difference in pressure between process fluid pressure at the first and second taps. A process fluid velocity measurement device is positioned in the throat to measure a velocity of process fluid flowing therethrough and provide a fluid velocity indication. The differential pressure sensor signal and the fluid velocity indication are used to provide a calculated indication of fluid flow parameters and/or fluid density.

DETAILED DESCRIPTION OF ILLUSTRATIVE EMBODIMENTS

Embodiments of the present invention generally include the perception and solution of specific problems encountered in measuring the flow of fluid in a conduit. For example, as density of the fluid varies, a vortex flow meter measurement must be compensated to provide an accurate mass flow rate measurement. If the velocity of the fluid is measured, such as via a vortex shedding measurement, the fluid density may be calculated by solving Bernoulli's equation for density:

$$\rho = k \frac{2 \times \Delta P}{v^2}$$

Further, compensation for variation in the Reynolds number/Strouhal number relationship of a vortex flow meter is required if an accurate flow measurement is desired outside of the quasi-linear range. Additionally, it may be difficult to accurately measure flow outside of the "quasi-linear" relationship region of the vortex flow meter. However, if the density and velocity can be measured and/or calculated, then the Reynolds number may be calculated based on an assumed, calculated, or measured viscosity value. Then the precise location of the Reynolds number/Strouhal curve could be known and this would extend the useful range of a vortex flow meter and improve the accuracy inside of the normal range of usefulness.

Figure 1:
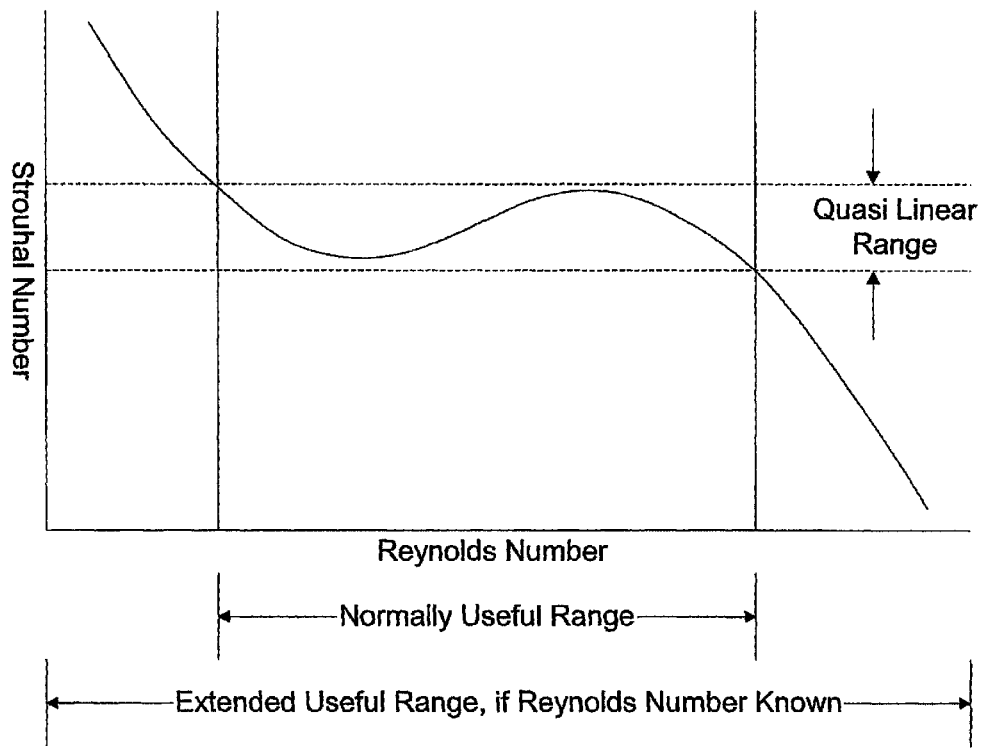
FIG. 1 is a chart illustrating a normal useful range for a vortex flow meter as well as an extended range if the Reynolds number is calculated or otherwise known.

FIG. 1 is a chart illustrating a normal useful range for a vortex flow meter as well as an extended range if the Reynolds number is calculated or otherwise known. The quasi-linear range between the dashed lines is typically +/−0.5% to +/−2%.

Another difficulty in measuring fluid flow is the presence of multiple phases. Specifically, two-phase or even three-phase fluids can be present in the conduit. Examples include quality steam; oil and water; oil and gas; particles in a liquid (slurry); or oil, water, and gas. If both the velocity and density of the fluid in the conduit could be measured, the mass flow of multi-phase fluid can be calculated. For example, see U.S. Pat. No. 4,312,234.

Figure 2A:
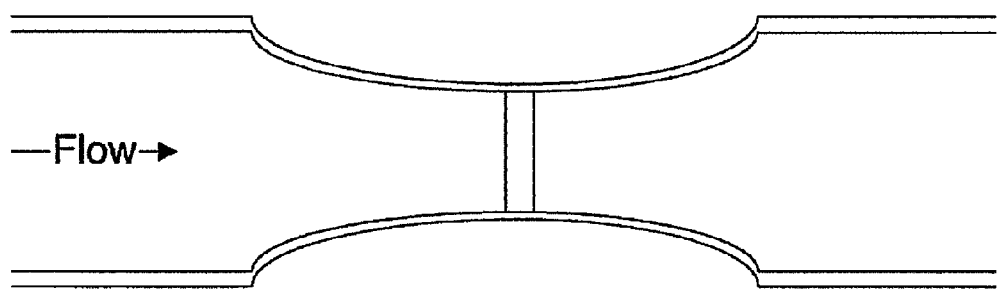
FIG. 2A is a diagrammatic cross-sectional view of a vortex shedder bar mounted in a low-loss, or non-conical venturi in accordance with an embodiment of the present invention.
Figure 2B:
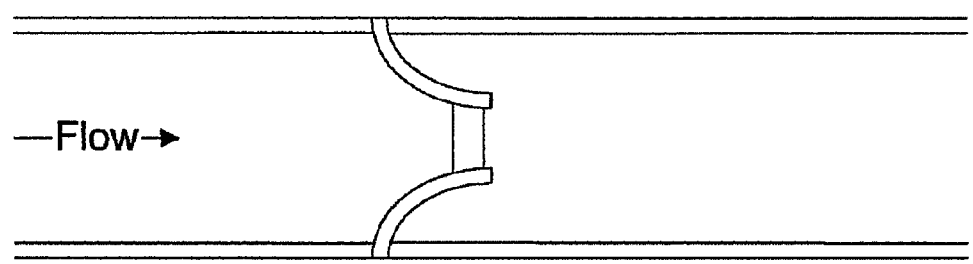
FIG. 2B is a diagrammatic cross-sectional view of a vortex shedder bar mounted in a nozzle in accordance with another embodiment of the present invention.

In accordance with one embodiment of the present invention, a vortex sensing arrangement is placed within a venturi (shown in FIG. 3) or within a low-loss (non-conical) venturi or nozzle (shown in FIG. 2A or 2B, respectively) disposed within the fluid flow in the conduit. As used herein, a "venturi" is mechanical in arrangement that includes a constricted throat section in which the velocity of the fluid increases while the pressure across the throat decreases. The venturi may be a classical configuration with a 21 degree conical inlet, cylindrical throat, and a 7 to 15 degree conical outlet. However, the venturi may simply be two reducing flanges on a cylindrical body or throat. Differences in discharge coefficient can be characterized by calibration. Alternatively, in some embodiments, the exit cone of the venturi may be omitted or truncated thereby creating essentially a nozzle with the vortex sensor mounted in the throat of the nozzle.

Figure 3:
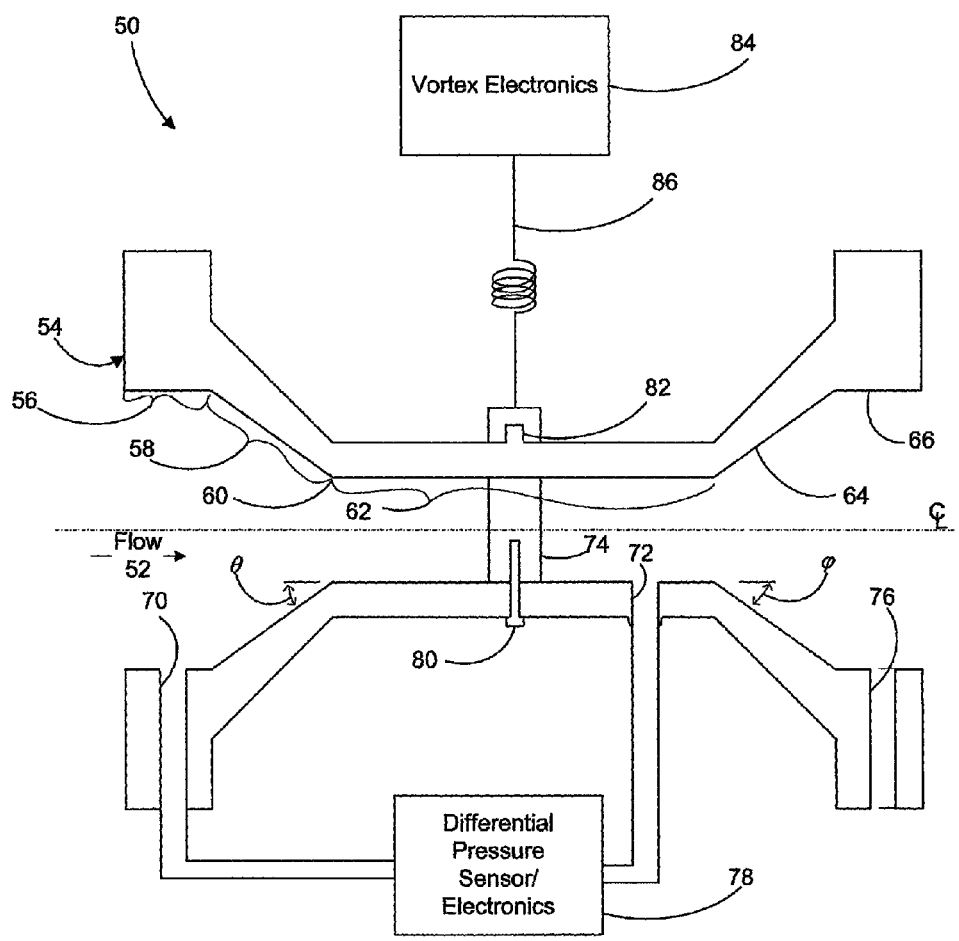
FIG. 3 is a diagrammatic view of an improved fluid flow measurement system in accordance with a preferred embodiment of the present invention.

FIG. 3 is a diagrammatic view of an improved fluid flow measurement system in accordance with an embodiment of the present invention. As illustrated in FIG. 3, system 50 includes a venturi (shown in cross section) disposed to conduct fluid in the direction illustrated at reference numeral 52. Venturi 54 includes an inlet 56 that is preferably cylindrical and has a diameter that is substantially the same as the diameter of the flow conduit, such as a pipe (not shown in FIG. 3), to which venturi 54 is coupled. Venturi 54 also includes neck-down portion 58 that has a gradually diminishing diameter beginning with an outer diameter that substantially matches that of inlet 56 and ending with a final diameter 60 that is substantially equal to the diameter of throat 62. The inlet angle θ of neck-down portion 58 can be any suitable angle ranging from 10-90 degrees. Throat 62 has a diameter that is significantly less than that of inlet 56. The change in diameter increases the velocity of the fluid flowing therethrough while reducing the pressure. Venturi 56 also includes exit cone 64 that returns the diameter to that of the flow conduit at exit 66. Exit angle φ can also be any suitable angle ranging from 0 to 90 degrees.

System 50 includes a plurality of pressure taps at different locations within venturi 54. Specifically, an upstream (high) pressure tap 70 is preferably proximate inlet 56. Although pressure tap 70 is shown in FIG. 3 as being disposed at entrance 56, pressure tap 70 may also be located at a suitable position within the cylindrical neck-down section 58. Further, pressure tap 70 could also be located in an adjacent portion of upstream conduit. A throat (low) pressure tap 72 is provided within throat 62, preferably downstream from vortex shedder bar 74. However, pressure tap 72 can be located upstream from shedder bar 74. An optional downstream exit pressure tap 76 can also be provided to potentially measure frictional drop (total pressure loss due to the restriction), such as described in U.S. Pat. No. 4,312,234. As illustrated in FIG. 3, upstream pressure tap 70 and throat pressure tap 72, at least, are operably coupled to differential pressure sensor 78. Differential pressure sensor 78 is configured, in accordance with known techniques, to provide an electrical indication related to the difference between the pressures of taps 70 and 72. The differential pressure sensor 78 can also be accompanied with differential pressure sensing electronics coupled to sensor 78 to measure the electrical characteristic (such as capacitance) of sensor 78 and convey an indication related to differential pressure over a process communication loop, for example. Thus, differential pressure sensor 78 can also include an entire differential pressure transmitter. Moreover, in embodiments where downstream tap 76 is employed, that tap can be coupled to an additional pressure sensor to measure either its absolute pressure or its differential pressure relative to one of taps 70 and 72.

System 50 includes vortex shedder bar 74 disposed within throat section 62. Preferably, vortex shedder bar 74 extends completely across the diameter of throat section 62. However, embodiments can be practiced where the shedder bar does not extend completely across the diameter. Preferably, a temperature probe 80 is included that is disposed at shedder bar 74 to measure the temperature of fluid proximate to shedder bar 74. Temperature probe 80 can include a temperature sensor disposed therein in accordance with any suitable temperature sensing technology including, but not limited to, a resistance temperature device (RTD), a thermocouple, a thermistor, or any other suitable device. Vortex shedder bar 74 generates vortices and the generation of those vortices creates vibrations on shedder bar 74. Preferably, shedder bar 74 includes a sensor that is configured to sense those vibrations. Suitable sensors include piezoelectric sensor 82 that is operably coupled to vortex electronics 84 via line 86. While the vortex sensor 82 is shown as part of shedder bar 74, embodiments of the present invention can be practiced where the sensor itself is disposed at other locations but still able to sense the vortices. Examples of such a configuration include the vortex sensor being disposed immediately downstream from shedder bar 74. While embodiment illustrated with respect to FIG. 3 indicates vortex shedding frequency being measured with a distinct vortex sensor 82, a suitably sensitive pressure sensor disposed downstream from the vortex shedding bar may be able to detect pressure fluctuations and thus sense the vortices in that manner. Accordingly, in such an embodiment, the actual vortex sensor may simply be a pressure sensor disposed downstream of the vortex shedding bar. However, the vortex shedding frequency could also be measured using the differential pressure sensor 78, as a high frequency wave superimposed on the differential pressure signal.

Vortex electronics 84 are configured to measure a frequency of the vibrations induced by pressure fluctuations from the generated vortices. As described above, it is known that the frequency of such vortices is related to flow. Accordingly, vortex electronics 84 is able to make a direct measurement of velocity of the fluid passing through throat section 62. Vortex electronics 84 can also include vortex flow meter electronics such that the measured frequency can be conveyed over a process communication loop. Thus, vortex electronics 84 can be embodied within a vortex flow meter. However, embodiments of the present invention can be practiced where vortex electronics 84 and differential pressure sensor electronics 78 are disposed within a single device that is able to combine the measurements in ways to provide more descriptive and/or accurate fluid flow information. Additionally, temperature probe 80 can be coupled to one or both of vortex electronics 84 and differential pressure sensor electronics 78. Accordingly, the differential pressure measurement and vortex-shedding measurement can be provided in a single device or spool piece. Further, these flow measurements can be combined in such a way that simplifies calculation and/or even enables calculations relative to two-phase fluid flow; three-phase fluid flow; mass flow where the velocity is measured from the vortex sensor and the density is measured from the venturi differential pressure measurement; and/or simply providing higher accuracy where the vortex-measurement is corrected for Strouhal number curvature based on the Reynolds number. Further, the calculated indication of fluid flow can include, without limitation, total flow of fluid of varying density; total flow of a multiphasic flow; flow of a component of a multiphasic flow; and the ratio of the flow of one component to another component in a multiphasic flow.

Figure 4:
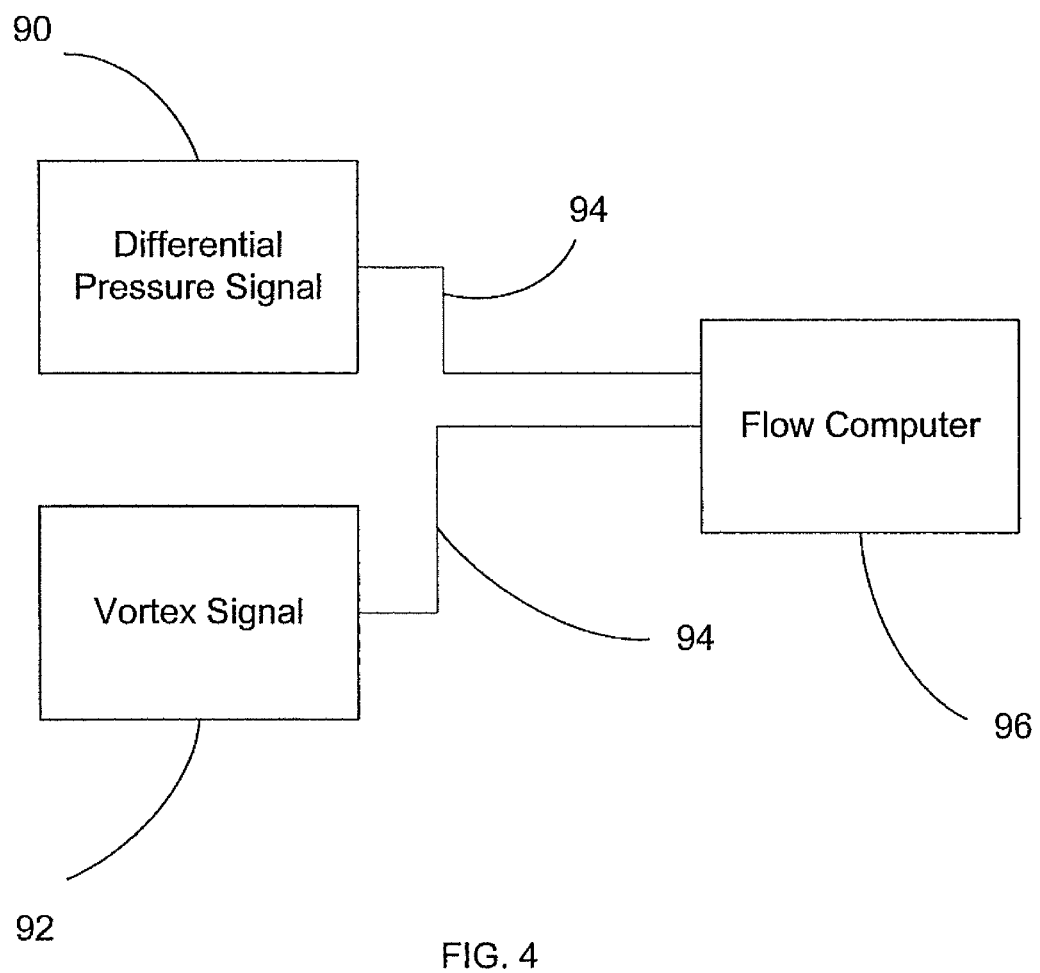
FIG. 4 is a diagrammatic view of a differential pressure signal and a vortex signal being provided to a flow computer in accordance with an embodiment of the present invention.

While a preferred embodiment of the present invention includes a unitary device having multiple sensing regimes within a single spool piece, embodiments of the present invention can include two distinct field devices (such as a differential pressure transmitter and a fluid velocity measuring field device) operably coupled to the spool piece where each field device conveys its measurement over a process communication loop to a suitable device for calculation of the higher-level fluid parameters described above. As illustrated in FIG. 4, the differential pressure sensor signal 90 and vortex sensor signal 92 can be conveyed, as illustrated by reference numeral 94 over a process communication loop to flow computer 96. Flow computer 96 can be any suitable device, including a field device, that is able to combine the differential pressure and vortex sensor signals to provide a useful indication of fluid flow. While reference numeral 94 illustrates a process communication loop, any suitable process communication loop can be used. Examples of process communication loops include the Highway Addressable Remote Transducer (HART®) protocol and the FOUNDATION™ Fieldbus protocol. Additionally, wireless communication protocols may also be employed. Further still, each such field devices (differential pressure transmitter, vortex flow meter, and/or flow computer) can be constructed to be explosion-proof and/or intrinsically safe. As used herein, intrinsically safe means that the field device complies with one or more intrinsic safety specifications such as those set forth in APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research October, 1998.

While embodiments of the present invention described thus far have generally focused on a vortex sensor coupled to a vortex shedding bar disposed within a throat of a venturi, or a nozzle, additional velocity sensing regimes can also be used. Accordingly, in accordance with another embodiment of the present invention, a magnetic flow meter sensing technology is disposed within the throat of venturi or a nozzle. Such an arrangement can also facilitate calculations related to multiphasic process fluid flow or provide a mass flow indication of a process fluid having a varying density.

Figure 5A:
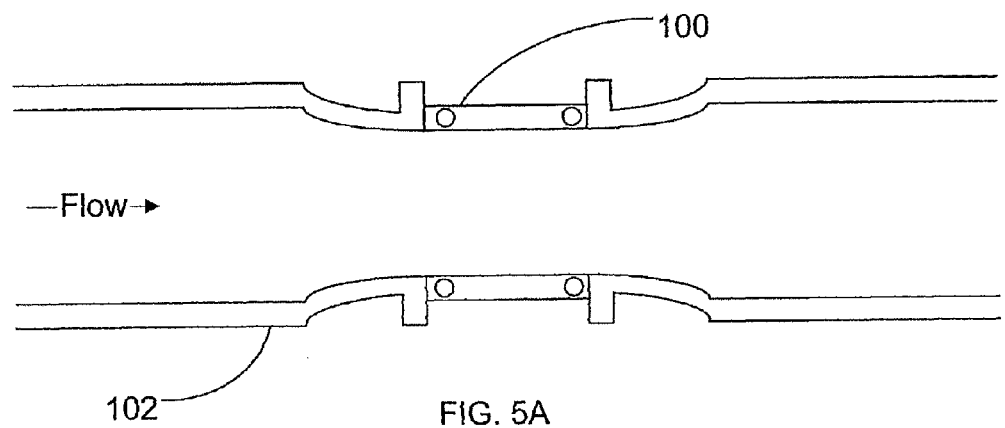
FIG. 5A is a diagrammatic cross-sectional view of a magnetic flow meter mounted in a low-loss, or non-conical venturi in accordance with an embodiment of the present invention.
Figure 5B:
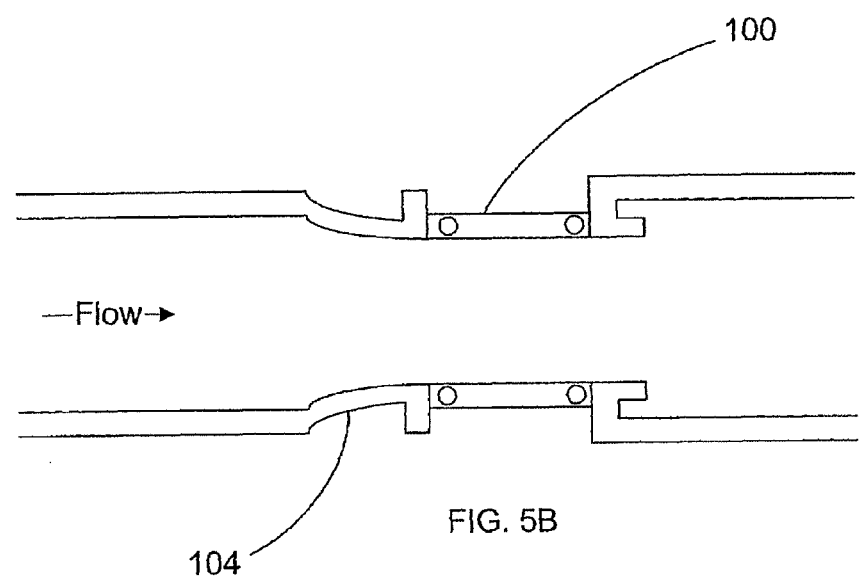
FIG. 5B is a diagrammatic cross-sectional view of a magnetic flow meter mounted in a nozzle in accordance with another embodiment of the present invention.
Figure 6:
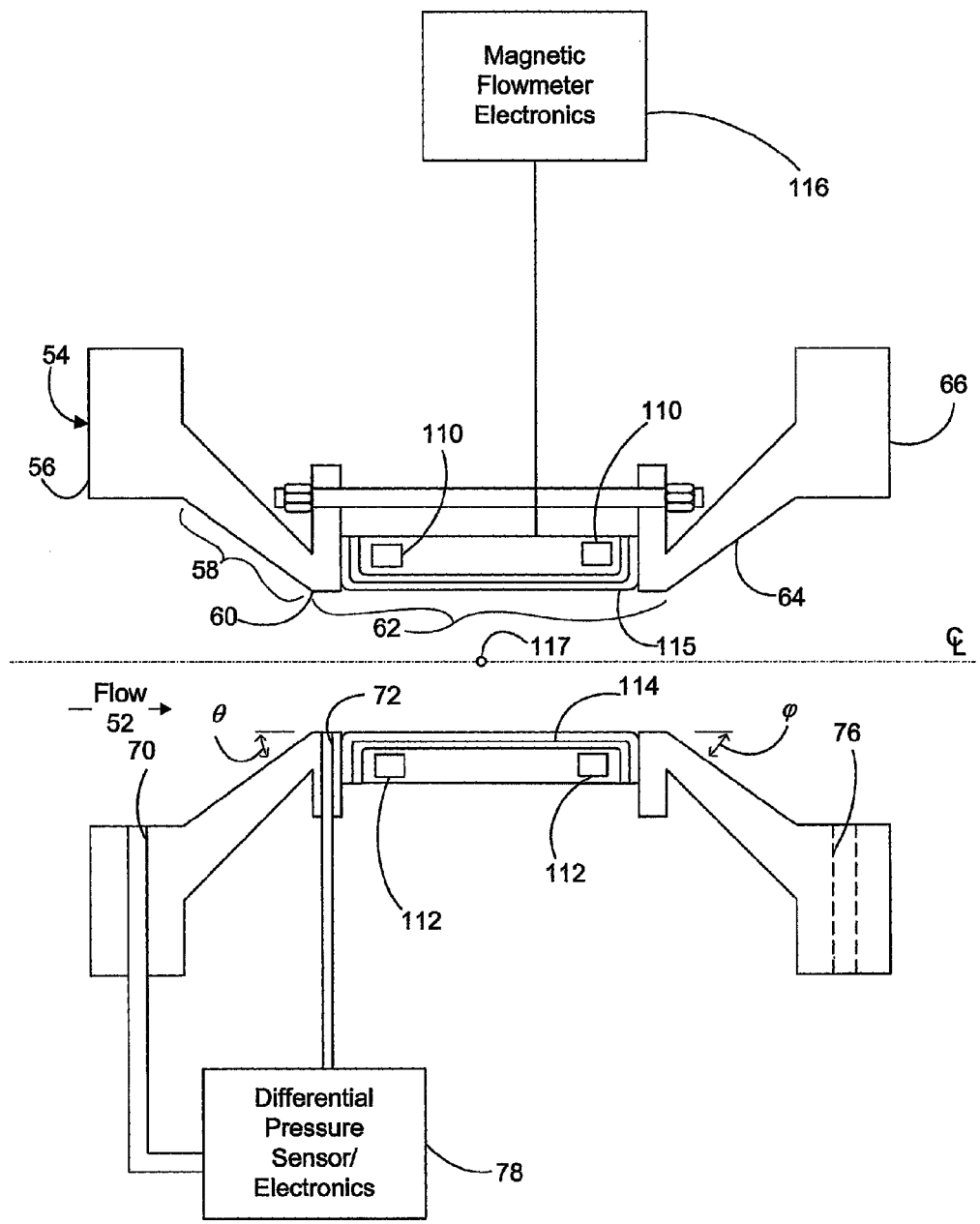
FIG. 6 is a diagrammatic view of an improved fluid flow measurement system in accordance with a preferred embodiment of the present invention.

A magnetic flow meter is illustrated diagrammatically at reference numeral 100 in FIGS. 5A and 5B. FIG. 5A illustrates a magnetic flow meter disposed within a constricted-diameter throat section of venturi 102 while FIG. 5B shows magnetic flow meter 100 disposed within a constricted-diameter throat section of nozzle 104. As with the vortex measurement embodiment, FIG. 6 illustrates a magnetic flow meter with conical reducers forming a venturi. FIGS. 5A and 5B are shown in a low-loss (non-conical) venturi and a nozzle, respectively.

FIG. 6 is a diagrammatic view of an improved fluid flow measurement system in accordance with an embodiment of the present invention. FIG. 6 bears some similarities to FIG. 3, and like components are numbered similarly. As illustrated in FIG. 6, magnetic flow meter coils 110 and 112 are disposed within magnetic flow meter body 114 on opposite sides of the flow conduit and lined with non-conductive liner 115. Coils 110 and 112 are operably coupled to magnetic flow meter electronics 116 which are able to both drive the coils to generate the magnetic field in the process fluid and to sense the emf, induced in the process fluid flowing through body 114 using electrodes disposed to contact the fluid, such as electrode 117. Additionally, magnetic flow meter electronics 116 may also include suitable communication circuitry to communicate a flow parameter over a process communication loop. In such embodiments, flow meter electronics can be considered to comprise all electronics required of a magnetic flow meter. As set forth above with respect to FIG. 3, both magnetic flow meter electronics 116 and differential pressure sensor electronics 78 can be embodied within a single device, preferably a single field device.

Figure 7:
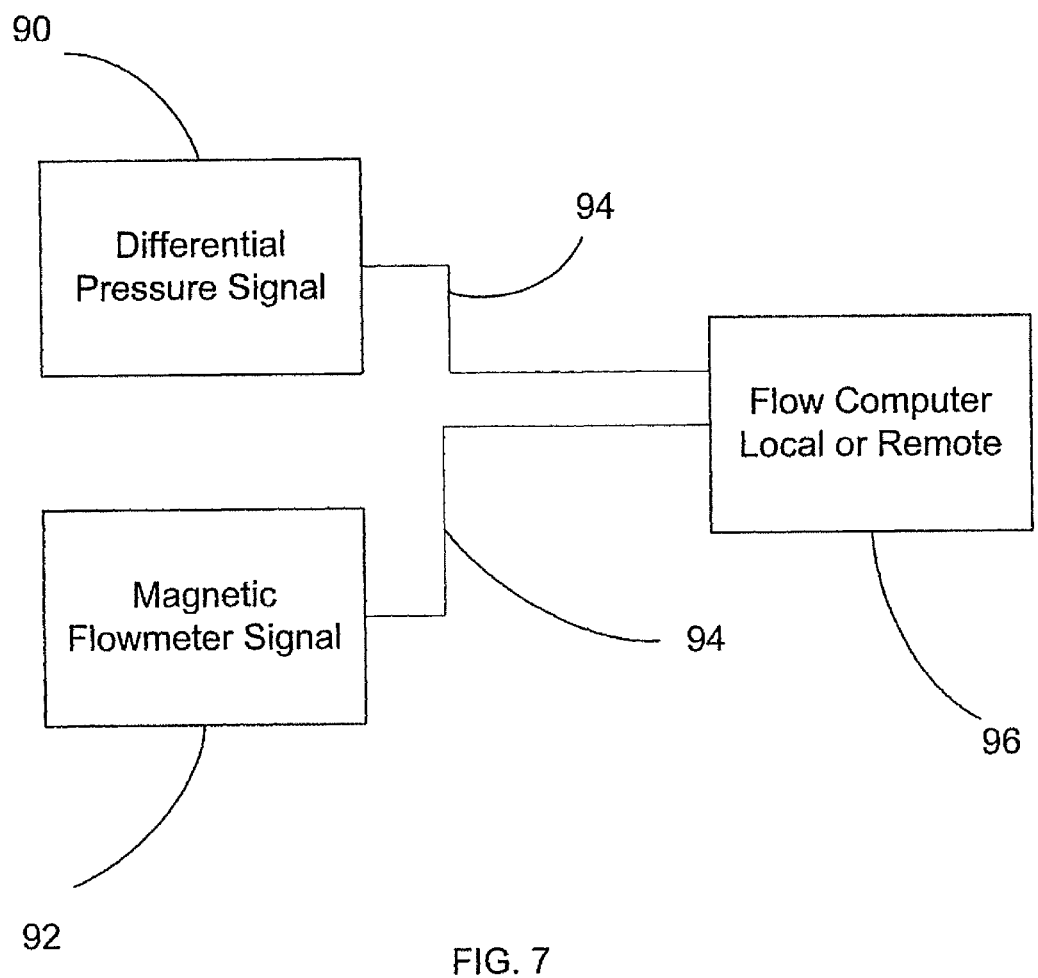
FIG. 7 is a diagrammatic view of a differential pressure signal and a magnetic flow meter signal being provided to a flow computer in accordance with an embodiment of the present invention.

Alternatively, both the differential pressure sensor signal 90 and the magnetic flow meter signal 92 can be conveyed over process communication loop 94 to flow computer 96 or other suitable device as shown in FIG. 7. As set forth above, process communication loop 94 can be a wired process communication loop or a wireless process communication loop. Moreover, flow computer 96 can be any suitable device located remote from or proximate to magnetic flow meter electronics 116 and differential pressure sensor electronics 78 (shown in FIG. 6).

By using the magnetic flow meter signal and the differential pressure sensor signal, the combined device is able to provide useful indications of fluid flow relative to two-phase fluid flow, part of a three-phase fluid flow, and mass flow even while the process fluid density varies significantly. Further, an indication can be provided related to total mass flow, the mass or volume of multi-phase flow components, density, or other suitable parameters.

The embodiments illustrated in FIGS. 3 and 6 illustrate a venturi embodiment of the present invention. A classical venturi typically includes a 21 degree conical inlet and a seven to fifteen degree conical outlet. For the embodiment illustrated in FIG. 6, the venturi can be comprised simply of two conical reducing flanges bolted to a wafer-type magnetic flow meter.

Furthermore, the accuracy of many velocity flow meters (such as an electromagnetic flowmeter of vortex flowmeter) is adversely affected by being mounted adjacent to a non-cylindrical conduit, such as is described in the preferred embodiments. Therefore, it is useful to calibrate the velocity flowmeter and the differential producer together as one unit, thereby characterizing the effects of the adjacent non-cylindrical conduit, and improving the accuracy of said flowmeter.

The discharge coefficient of primary element (differential producer) may also be affected by the presence of the velocity flowmeter in the throat, and therefore the discharge coefficient of the primary element could be determined in the same calibration as the velocity flowmeter.

Figure 8:
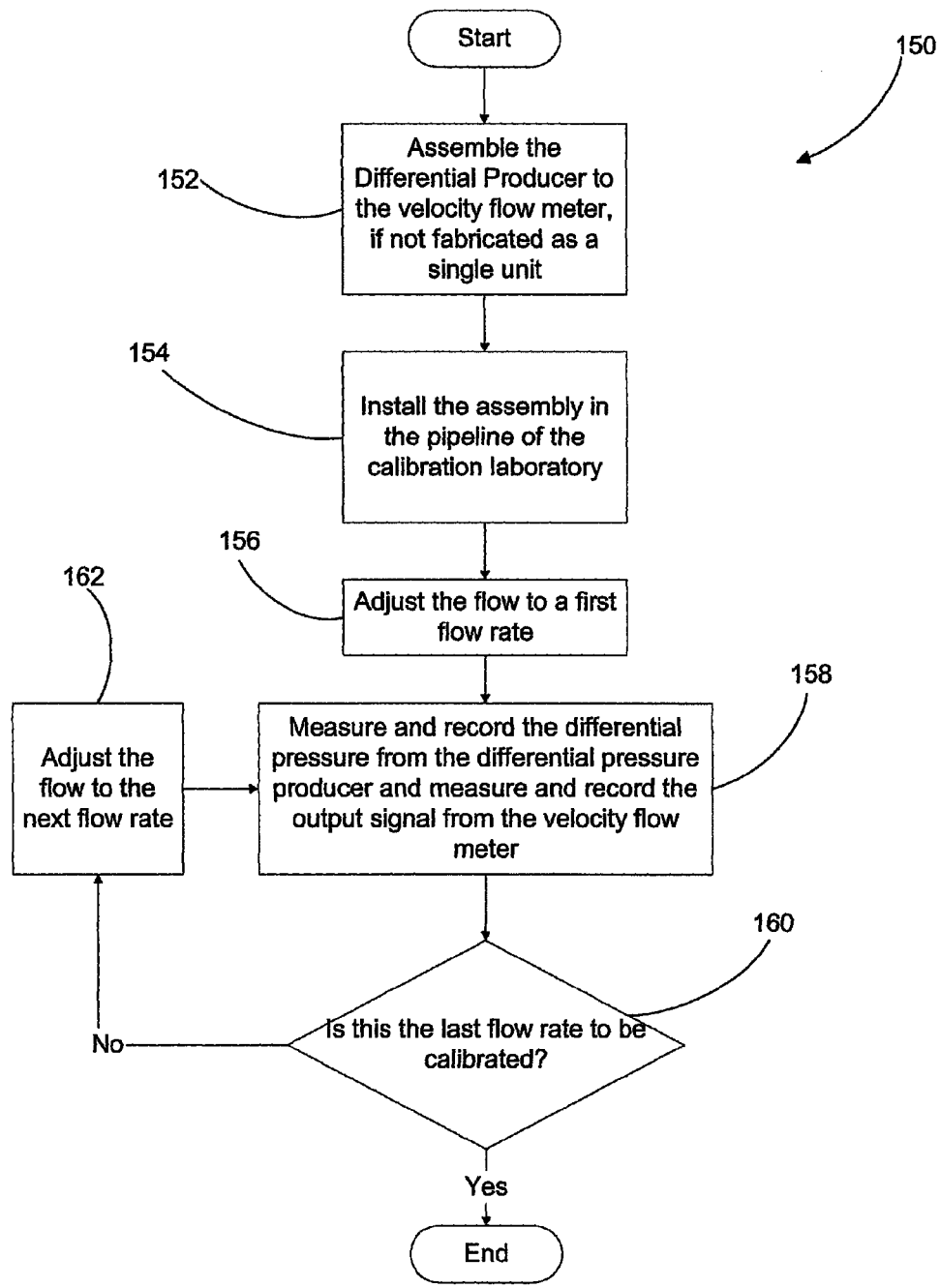
FIG. 8 is a flow diagram of a method of calibrating a velocity flow meter with a differential producer in accordance with an embodiment of the present invention.

FIG. 8 is a flow diagram of a method of calibrating a velocity flow meter with a differential producer in accordance with an embodiment of the present invention. Method 150 includes block 152 where a differential pressure producer is assembled to a velocity flow meter. At block 154, the assembly is installed in the pipeline of a calibration laboratory. At block 156, the flow rate through the pipeline is adjusted to a first flow rate. At block 158, the differential pressure from the differential pressure producer is measured and recorded. Additionally, the output signal from the velocity flow meter is also measured and recorded at block 158. At decision point 160, the method determines if the last flow rate has been calibrated. If so, the method ends. If not, control passes to block 162 where the flow rate is adjusted, after which control returns to block 158.

Although the present invention has been described with reference to preferred embodiments, workers skilled in the art will recognize that changes may be made in form and detail without departing from the spirit and scope of the invention. For example, there are a number of possible geometries based on different types of differential pressure primary elements that are believed to have sufficient "throat" length to mount a magnetic flow meter. The venturi could be fitted with three taps, as illustrated in FIG. 6, instead of the normal two for the additional purposes of measuring the "frictional pressure loss" described in U.S. Pat. No. 4,312,234.

What is claimed is:

1. A process fluid flow measurement device comprising:
   a fluid flow member having an inlet with a first diameter and a throat with a second diameter that is smaller than the first diameter;
   a first process fluid pressure tap disposed proximate the inlet;
   a second process fluid pressure tap disposed proximate the throat;
   a differential pressure sensor operably coupled to the first and second process fluid pressure taps;
   differential pressure measurement circuitry coupled to the differential pressure sensor to provide a differential pressure signal related to a difference in pressure between process fluid pressure at the first and second taps;
   a vortex flowmeter having a shedder bar positioned in the throat to measure a velocity of process fluid flowing therethrough and provide a fluid velocity indication; and
   wherein the differential pressure sensor signal and the fluid velocity indication are used to provide a calculated indication of fluid flow.

2. The device of claim 1, and further comprising a temperature probe operably coupled to at least one of the differential pressure measurement circuitry and the vortex flowmeter, the probe being configured to measure process fluid temperature.

3. The device of claim 2, wherein the probe is disposed to measure process fluid temperature in the throat.

4. The device of claim 1, wherein the fluid flow member is a venturi.

5. The device of claim 4, wherein the venturi has a neckdown section between the inlet and the throat with constantly diminishing diameter therebetween.

6. The device of claim 4, wherein the venturi is constructed from two conical pipe reducers.

7. The device of claim 1, wherein the fluid flow member is a nozzle.

8. The device of claim 1, and further comprising a temperature probe disposed in the shedder bar.

9. The device of claim 1, and further comprising a vortex sensor configured to detect vortices induced in the process fluid.

10. The device of claim 9, wherein the vortex sensor is a piezoelectric vortex sensor.

11. The device of claim 1, wherein the fluid velocity measurement device is calibrated while assembled together with the fluid flow member.

12. The device of claim 1, wherein the fluid flow member is calibrated while assembled together with the fluid velocity measurement device.

13. The process fluid flow measurement device of claim 1, wherein the second process fluid pressure tap is located downstream of the shedder bar.

14. The process fluid flow measurement device of claim 1, wherein a third process fluid pressure tap is located downstream of the throat.

15. The process fluid flow measurement device of claim 1, wherein the first and second process fluid pressure taps provide a fluid velocity indication.

16. The process fluid flow measurement device of claim 1, wherein the shedder bar is positioned such that it contacts only one wall of the fluid flow member.

17. A system for measuring process fluid flow, the system comprising:
   a process fluid flow member having an inlet with a first diameter and a throat with a second diameter that is smaller than the first diameter;
   a first process fluid pressure tap disposed proximate the inlet;
   a second process fluid pressure tap disposed proximate the throat;
   a differential pressure transmitter operably coupled to the first and second process fluid pressure taps to provide an indication of differential pressure;
   a magnetic flow meter having a plurality of electrodes disposed to contact the process fluid to measure a velocity of process fluid flowing through the throat and provide a fluid velocity indication; and
   a flow computer configured to receive the indication of differential pressure and the indication of fluid velocity and to calculate a process fluid flow parameter based thereon.

18. The system of claim 17, wherein the process fluid flow parameter is related to a component of multiphasic process fluid flow.

19. The system of claim 17, wherein the process fluid flow parameter is mass flow.

20. The system of claim 17, wherein the process fluid flow parameter is fluid flow velocity.

21. The system of claim 17, wherein the differential pressure transmitter and the magnetic flow meter are communicatively coupled together through a process communication loop.

22. The system of claim 21, wherein the process communication loop is a wired process communication loop.

23. The system of claim 21, wherein the process communication loop is a wireless process communication loop.

24. The system for measuring process fluid flow of claim 17, wherein a third process fluid pressure tap is located downstream of the throat.

25. The system for measuring process fluid flow of claim 17, wherein the first and second process fluid pressure taps provide a fluid velocity indication.

* * * * *